C. O. PEARSON.
ELEVATOR.
APPLICATION FILED MAR. 12, 1909. RENEWED DEC. 11, 1909.

990,493.

Patented Apr. 25, 1911.

Inventor:
Charles O. Pearson
By
E. W. Marshall
Attorney

C. O. PEARSON.
ELEVATOR.
APPLICATION FILED MAR. 12, 1909. RENEWED DEC. 11, 1909.

990,493.

Patented Apr. 25, 1911.

Witnesses:

Inventor:
Charles O. Pearson
By E. W. Marshall
Attorney

UNITED STATES PATENT OFFICE.

CHARLES O. PEARSON, OF NEW YORK, N. Y., ASSIGNOR TO OTIS ELEVATOR COMPANY, OF NEW YORK, N. Y., A CORPORATION OF NEW JERSEY.

ELEVATOR.

990,493.      Specification of Letters Patent.      Patented Apr. 25, 1911.

Application filed March 12, 1909, Serial No. 483,036. Renewed December 11, 1909. Serial No. 532,679.

*To all whom it may concern:*

Be it known that I, CHARLES O. PEARSON, a citizen of the United States, and a resident of the borough of Brooklyn, in the county of Kings, city and State of New York, United States of America, have invented certain new and useful Improvements in Elevators, of which the following is a specification.

My invention relates to elevators and its object is to arrange an elevator apparatus of the friction drive or so-called traction type to provide for an internal combustion engine being used as the motive power.

The invention resides in the construction and combination of parts herein shown and described, by means of which I attain the above object and at the same time obtain a simple and positive control of the car and the other parts of the apparatus.

Other objects of my invention will appear in the following specification in which I will describe the construction and arrangement of my improved apparatus, and the novel features of which I will set forth in the appended claims.

Referring to the drawings.

Like characters of reference designate corresponding parts in all of the figures.

10 designates the base upon which certain parts of the apparatus are mounted.

Figure 1:
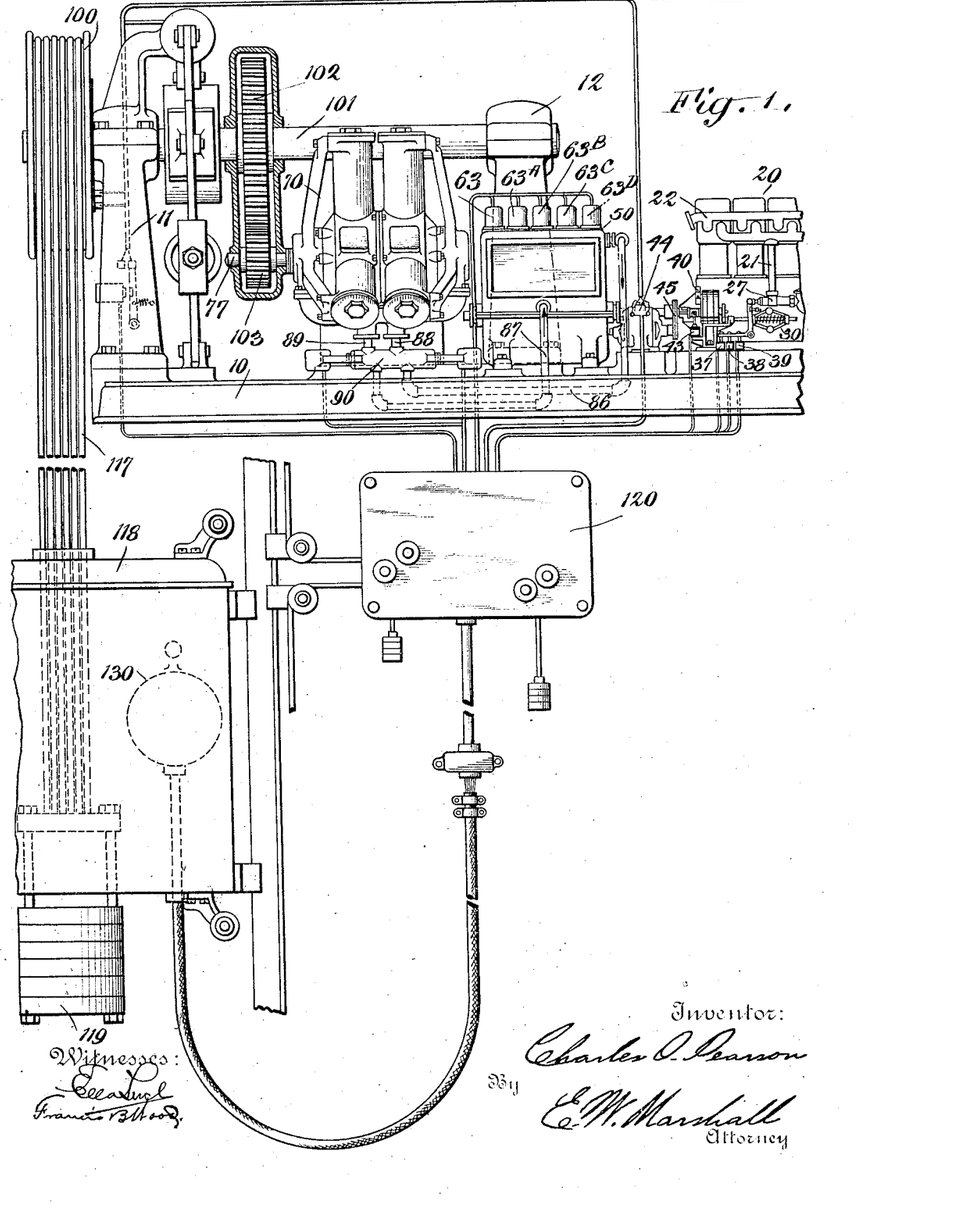
Figure 1 is a side elevation, partly in section, of an elevator embodying my invention.
Figure 2:
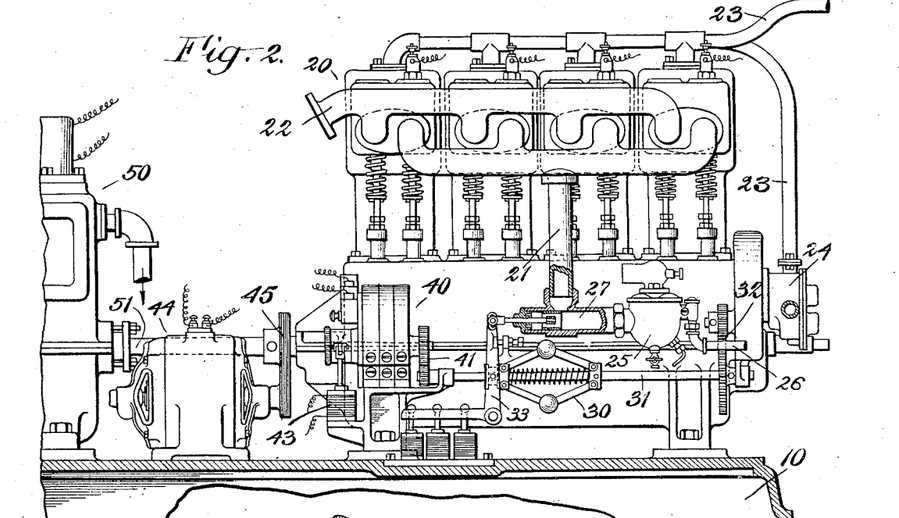
Fig. 2 is a side elevation of the engine and some of its connected parts with its bed-plate and throttle valve shown in section.

20 is an internal combustion engine which may be of any approved style or type. In this case I have shown it as a four-cylinder four-cycle engine of which 21 is the intake or supply pipe, and 22 the exhaust. 23 are water pipes through which water from a pump 24, which is driven by the engine, is circulated through its cooling jacket. As the engine itself forms no part of the present invention I will not further describe its parts.

Figures 3, 4, 5:
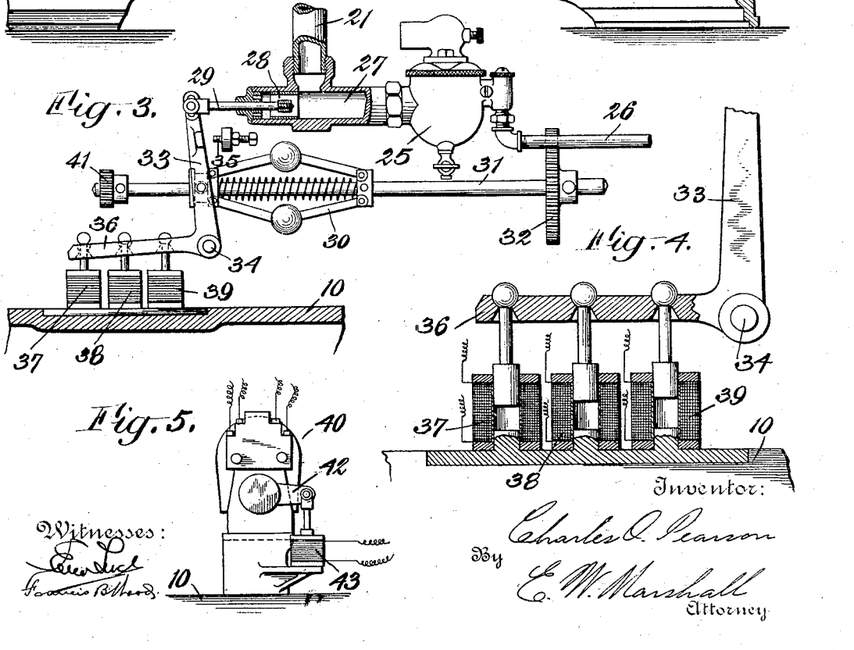
Fig. 3 is a side elevation, partly in section, of the throttle valve with its speed governor and controlling device.
Fig. 4 is a sectional side elevation of the electromagnetic controlling device.
In Fig. 5 I have shown in end elevation a sparking magneto and some of its associated parts.

25 is a carbureter connected with a fuel supply by the pipe 26, and with the intake of the engine through the cylinder 27 of a throttle valve, the piston of which is designated by 28. 29 is a piston rod connected with this piston.

30 is a centrifugal speed governor, the shaft 31 of which is driven by the engine through gearing 32. This governor is connected by a bell-crank lever 33 which is pivoted at 34 with the piston rod 29. These parts are so arranged that the throttle valve is closed or partly closed automatically when the engine reaches a predetermined speed, preferably somewhat less than its maximum.

35 is an adjustable stop for limiting the amount of closure of the throttle valve.

The lower arm 36 of the bell-crank lever is arranged to sustain the plungers or cores by a plurality of solenoids 37, 38 and 39 which are affixed to the base 10. These solenoids or electromagnets are arranged, when successively energized, to move the throttle valve open in a plurality of steps.

40 is a high tension magneto driven by the engine by means of gearing 41 on the end of the governor shaft 31. This magneto is suitably connected with the sparking device of the engine and is provided with a spark-regulating lever 42 which may be electromagnetically actuated by a solenoid 43.

44 is a dynamo upon the base 10 driven from the engine shaft by means of a chain 45 or other suitable mechanical connection. Its armature is designated by 46 and its shunt field by 47.

48 and 49 are its leads which are connected with both the armature and field windings.

Figure 6:
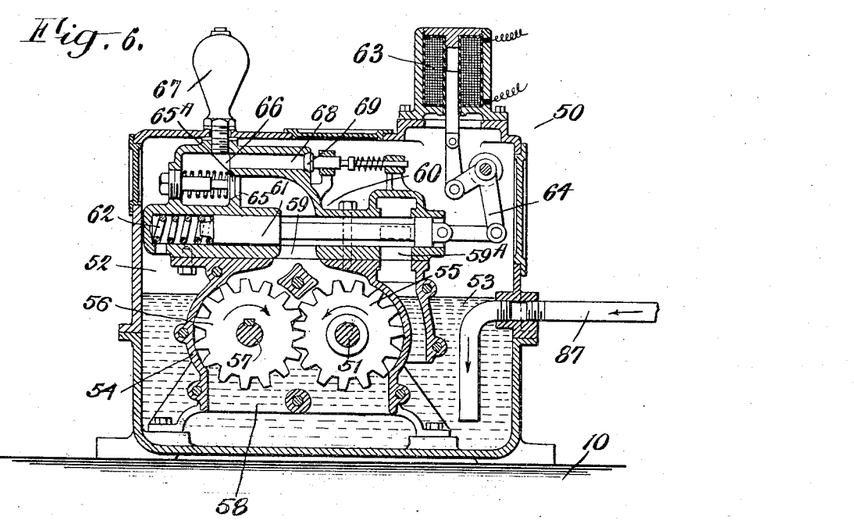
Figs. 6 and 7 are sectional end and side elevations, respectively, of a pumping apparatus which is connected with and arranged to be driven by the engine.
Figure 7:
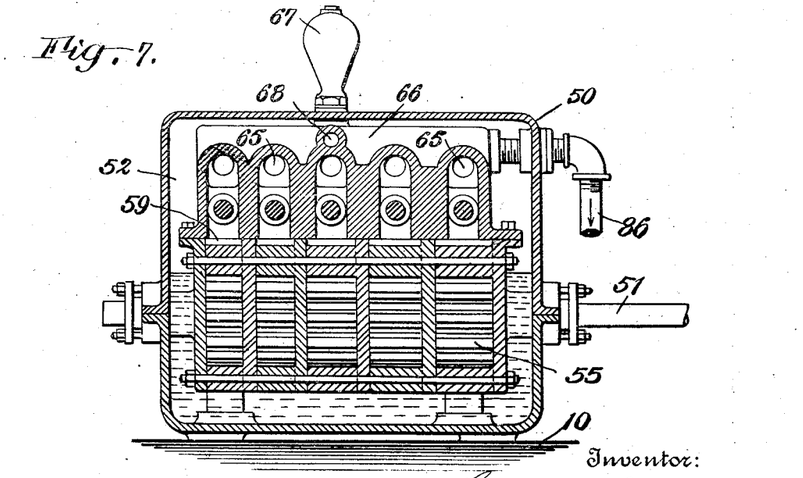

50 is a pumping apparatus of which the main shaft 51 is directly coupled with the engine shaft. This may be of any desired type. I have found that a rotary pumping apparatus, such as that shown somewhat in detail in Figs. 6 and 7, is a satisfactory kind for the purposes of this invention. In this case 52 designates a casing, the lower portion of which is constructed to form a reservoir or discharge tank for the fluid 53. Any suitable fluid may be used, but I prefer to use a non-compressible fluid such, for example, as a thin lubricating oil. Within this casing is a frame 54 which forms a plurality of inner compartments preferably of different widths. The shaft 51 passes through all of these compartments and has keyed to it a number of gears 55, one for each compartment. These gears are arranged to fit closely against the sides and ends of the compartments and are in mesh with a similar set of gears 56 upon an auxiliary shaft 57 which is supported in the ends of the casing 52. The lower portion of each compartment is open as at 58 and therefore in direct communication with the reservoir. The upper portion of each compartment is provided with a discharge port 59. Directly above each of these ports is a valve 60 which I will now describe. 61 is its piston, behind which is a spring 62 which tends to push the piston over into the position in which it is shown in Fig. 6. When in this position a free passage is provided between the pump discharge port 59 and its intake port 59ᴬ, so that the fluid which is forced upward by the gears will circulate within the pump itself.

63 is a solenoid so connected with the piston 61 by mechanism 64 that when it is energized it will move the piston inward until it closes the pump intake port 59ᴬ. It may be seen from the construction illustrated that the piston may be balanced so that the solenoid has only to overcome the compression of the spring and the friction of the moving parts. If the valve is thus moved inward the rotating gears will force the fluid up through port 59 and through a port 65 which is controlled by a check-valve 65ᴬ into a pressure chamber 66.

The parts above described are duplicated so that there is one set for each pump compartment. The chamber 66, however, is within one continuous casing which extends over all of the pump compartments. An air cushion 67 is connected with this pressure chamber.

68 is a port controlled by an adjustable relief valve 69 leading from the pressure chamber into the outer casing 52 and arranged to allow fluid within the pressure chamber to flow back into the reservoir whenever the pressure exceeds a desired limit.

Figures 8, 9, 10, 11:
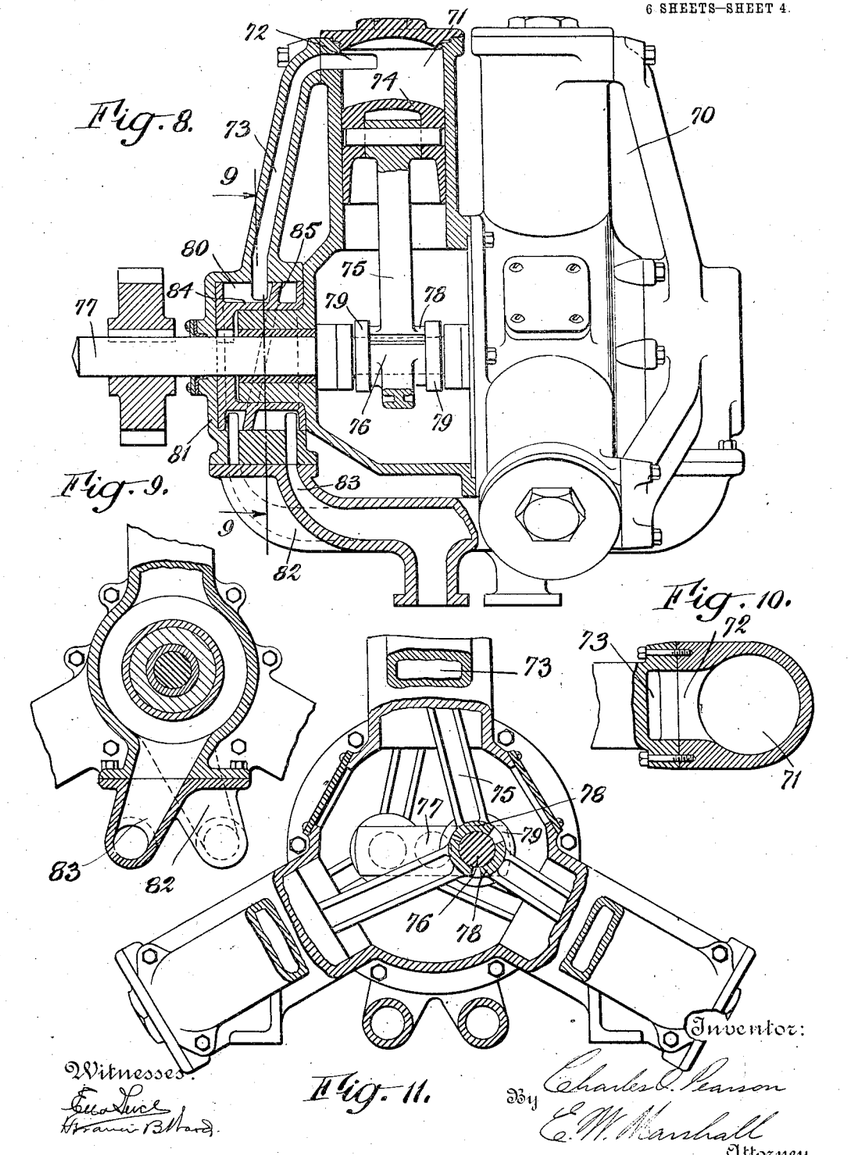
Fig. 8 represents in side elevation a fluid pressure motor. One half of this motor is drawn in section to more clearly illustrate its construction.
Fig. 9 is a sectional end elevation of a portion of this motor, the section of this figure being taken on the line 9—9 of Fig. 8.
In Fig. 10 I have shown in sectional plan view a detail of the motor cylinder and one of its connected parts.
Fig. 11 is a sectional end elevation of the central portion of the motor showing its crank-shaft and the manner in which the various parts of the motor are connected therewith.

The motor shown in Figs. 8, 9, 10 and 11 is a single-acting fluid pressure engine having two sets of three cylinders equally spaced about a central shaft. The engine I have designated in the drawings by the numeral 70. As all of the cylinders and pistons are of similar construction I will describe but one of them. 71 is the cylinder and 72 its port which alternately serves as an intake or discharge port. 73 is a passage connecting this port with the valve 80 which I will later describe. In Fig. 10 is shown the manner in which the parts forming the cylinder and the passage are connected together. 74 is a piston and 75 a connecting rod between the piston and the crank 76 which is offset from the main shaft 77. The end of the connecting rod is constructed as shown at 78 to abut against the crank and to form shoulders over which are fitted rings 79 which hold it in place. These parts are duplicated for each of the six cylinders. Fig. 11 shows that there are two cranks from the shaft 77 spaced 180° apart, and illustrates the manner in which the six connecting rods are connected therewith.

I will describe the valve 80 as shown in the left-hand portion of Fig. 8. 81 is a cylindrical casing, the upper portion of which is connected with the passage 73. The left-hand portion of this casing is connected with a passage 82 and the right-hand portion with a passage 83. 84 is a valve member affixed to the shaft 77 and arranged to rotate within the cylinder 81. This rotary valve member is provided with an obliquely disposed annular projecting rib 85 which, when rotated, is arranged to connect the passage 73 alternately with the passages 82 and 83 which are connected with the pumping apparatus 50 in a manner which I will fully describe hereinafter. Other passages similar to 73, disposed about the casing 81 at intervals of 120°, connect with the other two cylinders of this left-hand set. The three right-hand cylinders are similarly connected with another rotary valve like that just described.

The type of motor above described is not a part of the present invention, nor do I limit myself to this or any other specific type of motor, but I have briefly described this one as it is well adapted for use in combination with the other apparatus herein described. It has the advantages of being perfectly balanced, producing an even torque, and being free from dead centers.

Figures 12, 13, 14, 15, 16:
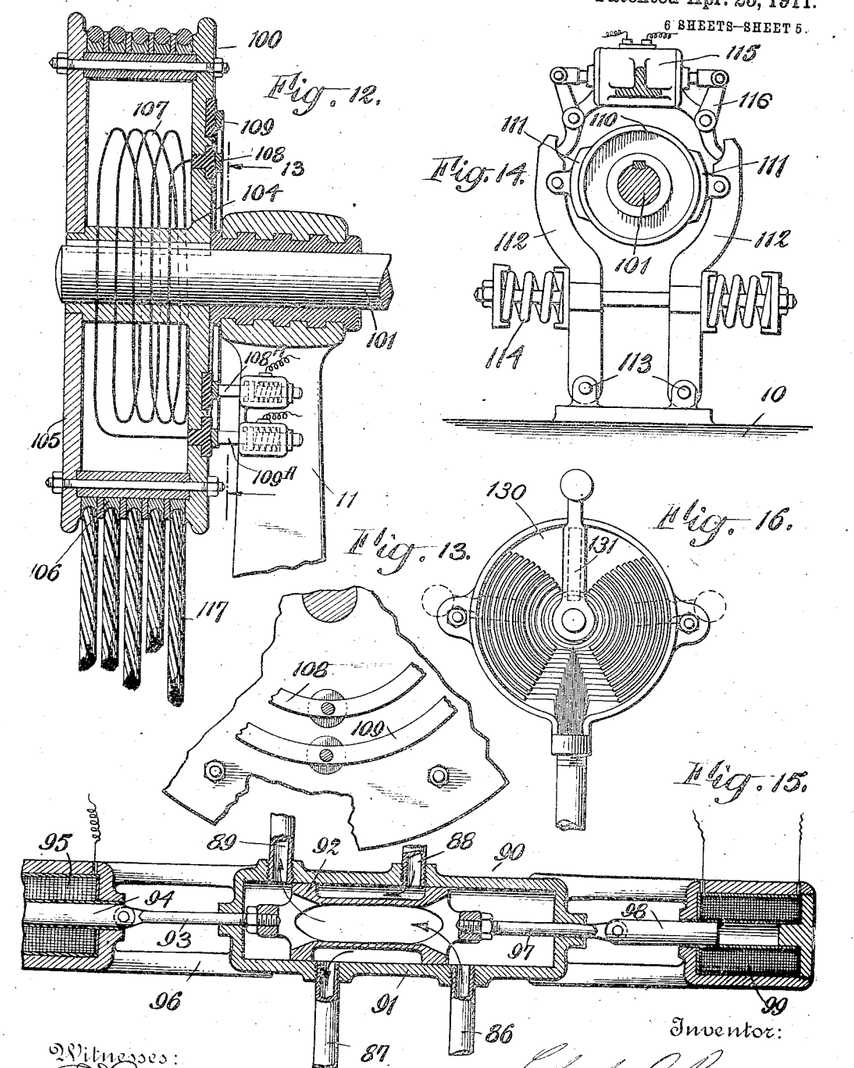
Fig. 12 is a sectional side elevation of a magnetic rope drive or traction sheave.
Fig. 13 is a fragmentary rear view of this traction sheave, showing its contact strips.
Fig. 14 shows an electromagnetically actuated brake in end elevation.
In Fig. 15 is shown in sectional side elevation an electromagnetically actuated fluid reversing valve.
Fig. 16 is a front elevation of the controlling switch or car switch with its cover-plate removed.

90 is a reversing valve between the pumping apparatus and the motor. A pipe 86 connects the pressure chamber 66 with this valve, and a pipe 87 runs from the reversing valve to the reservoir within the pump casing. Pipes 88 and 89 connect the valve 90 with the passages 82 and 83, respectively. The reversing valve comprises a cylindrical casing 91 with which these pipes are connected. Within this cylinder is a hollow piston valve 92 which is arranged, when in the position in which it is shown in Fig. 15, to provide paths of communication between the pipes 86 and 89, and 87 and 88, respectively. When the piston 92 is moved over to the right these connections are reversed and pipes 86 and 88, and 87 and 89 are put into communication.

93 is a piston rod affixed to one end of the valve piston and connected with a movable core 94 of a solenoid 95. This solenoid is supported by a frame 96 projecting from one end of the valve casing 91. When this solenoid is energized it will pull the piston over into the position shown in the drawings. At the other end of piston 92 is a piston rod 97 which is connected with a core 98 of a solenoid 99.

100 designates a rope sheave of special construction which is keyed to a shaft 101 supported in pedestal bearings 11 and 12 upon the base 10. A gear 102 is also keyed to this shaft. 103 is a pinion affixed to the motor shaft 77 and in mesh with the gear 102. It is obvious that the rotation of the motor in either direction will be transmitted to the shaft 101 by this mechanism.

The construction of the sheave is shown somewhat in detail in Figs. 12 and 13. It comprises a portion 104 which forms the hub and rear flange of the sheave, a front flange 105, and a rim 106 between these portions, which rim may be built up of separate layers of alternate magnetic and nonmagnetic material as shown. The portions 104 and 105 are constructed of iron or other magnetic material and within them is a winding 107, the terminals of which are connected with contact rings 108 and 109 which are insulated from but supported by the rear face of the rear flange. Against these contact rings bear brushes 108^A and 109^A. This form of sheave is used to increase its tractive effect upon the driven ropes which result is obtained by the magnetization of the parts by the current passing through the coil 107.

110 is a brake pulley rigidly affixed to the shaft 101. Brake-shoes 111 which are supported in levers 112 pivoted near the base 10 at 113, are arranged to be forced against this pulley by compression springs 114.

115 is a solenoid which is arranged when energized to pull a pair of cores together, and through levers 116 to force the brake-shoe levers 112 apart to release the shoes.

117 designates ropes or cables of the usual magnetic material which are run over the sheave 100 and to the car 118 and counterweight 119, to both of which they are affixed. The car and counterweight are held at rest by the brake above described, or are driven up or down by the rotation of the driving sheave 100.

Figure 17:
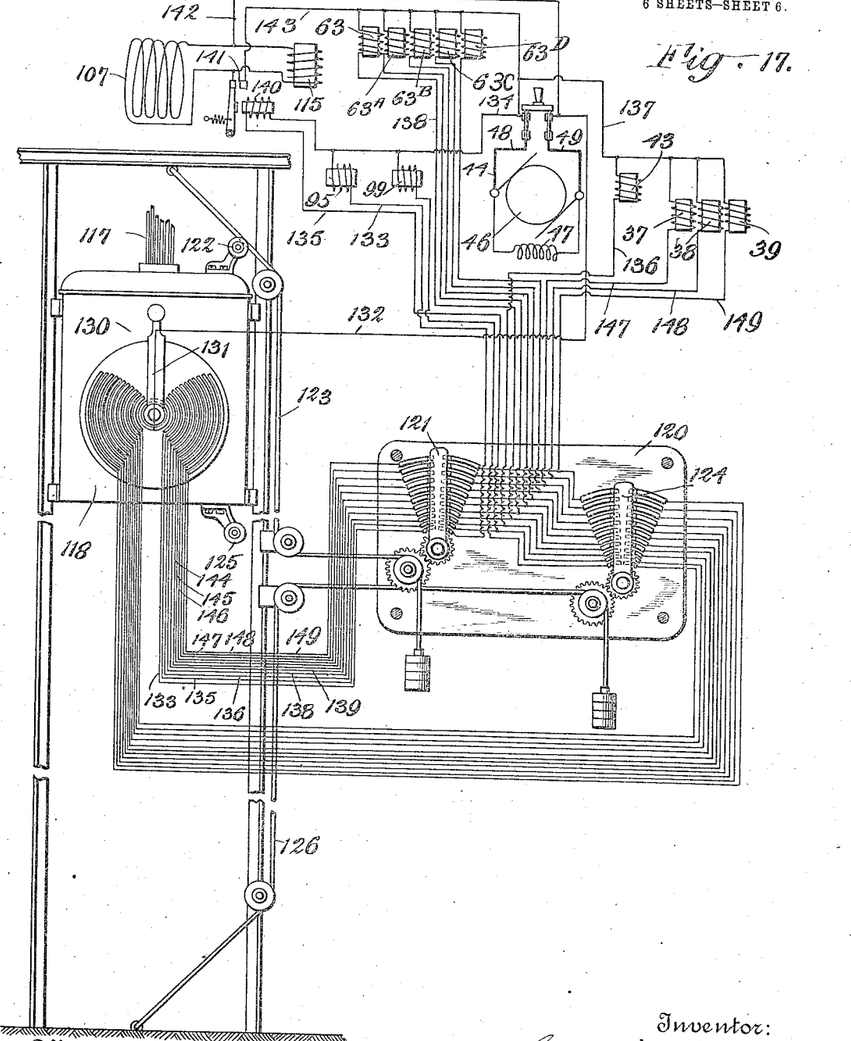
Fig. 17 is a wiring diagram showing certain electrical circuits and so much of the apparatus as is necessary to illustrate the manner in which these parts are connected.

The automatic stop-switch 120 which is shown in Fig. 1 and more in detail in the wiring diagram in Fig. 17, is not a part of this invention. I will therefore but briefly describe it. It comprises a switch-arm 121 which is arranged to be actuated by the movement of the car by means of a roller 122 on the car engaging a rope or cable 123 as the car nears the upper limit of its travel, and a similar switch-arm 124 actuated by the roller 125 on the car engaging a rope 126 as the car reaches the lower limit of its travel. It will not be necessary to further describe this device, except in pointing out the operation of the invention as other forms of automatic limit-switches may be used instead if desired.

130 is a manually operable controlling switch which is preferably placed in the car. It is shown in Figs. 16 and 17 and comprises a contact lever 131 which is arranged to be moved to one side or the other over certain fixed contacts to control the operation of the elevator driving machinery. I will describe it more fully in conjunction with the operation of the other parts of the apparatus.

When it is desired to use this elevator system the engine 20 is first started up and will run continuously under the control of the governor 30. As the dynamo 44 is mechanically connected with the engine it will create an available source of electrical energy. While the car is at rest no power will be consumed except that necessary to overcome the frictional resistance of these parts and that of the pumping apparatus 50. When the operator desires to run the car up he will move the switch-arm 131 to the right. 132 is a conductor from the generator lead 49 to the switch-arm. This first movement will close a circuit through one of the stationary contacts and its connected conductor 133 which leads through the automatic stop-switch 120, through solenoid winding 95, and by conductor 134 to the other generator lead 48. This will insure the reversing valve piston being drawn over to the left. A further movement of the switch-arm closes a circuit through conductor 135, through the winding 140 of a relay and back by a conductor 134 to the generator. This relay is arranged to close at its contacts 141, circuits through the brake winding 115, and the sheave-energizing winding 107, through conductors 142 and 143 which are connected with the generator. The next circuit to be closed is that through conductor 136, winding 43 and conductor 137 which causes the magneto 40 to be shifted to advance the ignition spark for the engine 20 to increase its speed. The fourth step of the operation will be the energization of the first pump solenoid 63 through conductors 138 and 143 which will cause the first section of the pumping apparatus to force fluid under pressure through the hydraulic motor 70 which will then rotate and drive the sheave 100 and the car 118. The power of the engine 20 is then available for driving the fluid by this one small section of the pump which will therefore force but a small quantity of the fluid through the motor 70 at a great pressure limited only by the power of the engine and the efficiency of the pump. Consequently the car will be driven slowly but with great force as the torque of the motor 70 under these conditions will be high. The four succeeding steps of operation will accelerate the motor and the car by energizing the pumping magnets 63$^A$, 63$^B$, 63$^C$, and 63$^D$ successively through conductors 139, 144, 145 and 146. These, it may be seen, throw into operation the remaining portions of the pumping apparatus in a plurality of steps and cause the latter to deliver the fluid to the motor 70 in increasing quantities but at proportionately decreasing pressures. Thus the speed of the driving motor will be increased if the load on the car is not heavy. This means that any practical load on the car may be driven at some speed and that such speed may be as high as the amount of the load and the power of the engine will permit. In this connection it may be noted that the number of the sections of the pumping apparatus may be increased if it is desired to have a greater number of steps of acceleration. The air chamber 67 between the pump and the motor will produce a cushioning effect so that the acceleration will be smooth and gradual. The speed of the motor and of the car cannot be greater than the circulation of the fluid through the motor and the pump will allow. Therefore the car cannot race or run away. After these operations, a further movement of the controlling switch will close a circuit through conductor 147, solenoid winding 37, and conductor 137, and the energization of this winding will cause the arm 36 to be pulled down a certain amount to open the throttle valve 28 against the action of the governor 30. Solenoid windings 38 and 39 may similarly be energized through conductors 148 and 149 to increase the amount of opening of the throttle valve. These operations will increase the speed of the engine 20 and consequently that of the pump, the engine, and the car. I have shown three steps of this electromagnetic accelerator, but obviously a greater or less number of steps may be employed, according to the refinement of operation required.

The above operations may be reversed to slow down or stop the car. It is to be understood that all of the conductors from the car-switch to the other parts of the apparatus, except that one designated by 132, are run through the automatic stop-switch 120. When the car reaches the upper limit of its travel and actuates the switch-arm 121 this will break the various circuits above traced in the same order as they will be broken when the operator returns the car-switch lever to its central position and will thus insure a gradual and positive stop of the car at the upper limit of its travel.

When the car-switch lever is moved to the left instead of to the right the above operations will be repeated, except in this case the winding 99 of the reversing valve will be energized to cause the motor 70 to run in the opposite direction, and the various circuits will be led through that part of the automatic stop-switch which is controlled by the switch-arm 124, and is actuated by the car at the lower end of its run.

Such an arrangement as is herein disclosed is applicable to other types of elevators than the simple form shown. One of the obvious modifications would be to use a winding drum in place of the traction sheave, and it is to be understood that some of the claims which specify a driving sheave contemplate the use of a winding drum as an equivalent. The hydraulic or fluid pressure transmission gearing is especially effective for transmitting the power generated by an internal combustion engine to elevators as the engine may be continuously run at a practically constant rate of speed and the driving effect is greatest at the low speeds so that a car may be easily started and may be readily controlled in making landings, for the car may be slowed down as much as desired and stopped at a certain point positively. The power consumed by the apparatus will be proportional to the actual work done.

The brake is not applied until the driving power is shut off and is added only as a safeguard for holding the car at rest. The hydraulic motor itself also acts as a brake to hold the parts at rest.

I have shown the engine and pumping apparatus mounted upon a common base with the motor and hoisting mechanism. It is evident that this is not necessary, for these parts may be placed in different rooms, or even in different buildings if desired so long as they may be connected by suitable pipes and electrical conductors. The engine which creates the driving power for the car also causes the electrical energy by which the control is effected to be generated. Such an elevator system as I have described is especially applicable for heavy duty elevators such as are in common use in office buildings where the apparatus is in almost constant use during certain hours of the day.

What I claim is:—

1. In an elevator, a car, a hoisting apparatus, comprising a driving sheave, connections between the car and the sheave, an internal combustion engine, and a fluid pressure power transmission mechanism between the engine and the sheave, said mechanism comprising a fluid pressure motor.

2. In an elevator, a car, a hoisting apparatus comprising a driving sheave, cable connections between the car and the sheave, an internal combustion engine arranged to run in one direction, and a fluid pressure power transmission mechanism between the engine and the sheave, said mechanism comprising a fluid pressure motor and a reversing valve therefor.

3. In an elevator, a car, a hoisting apparatus, cable connections between the car and hoisting apparatus, an internal combustion engine, a fluid pressure power transmission mechanism between the engine and the hoisting apparatus, and means for controlling said transmission mechanism from the car.

4. In an elevator, a car, a hoisting apparatus comprising a driving sheave, cable connections between the car and the sheave, an internal combustion engine arranged to run in one direction, a fluid pressure power transmission mechanism between the engine and the sheave, said mechanism comprising a fluid pressure motor and a reversing valve therefor, and means for controlling the transmission mechanism and the reversing valve from the car.

5. In an elevator, a car, a hoisting apparatus comprising a driving sheave, cable connections between the car and the sheave, an internal combustion engine arranged to run in one direction, a fluid pressure power transmission mechanism between the engine and the sheave, said mechanism comprising a reversible fluid pressure motor and a reversing valve therefor, and manually operated means in the car for controlling the transmission mechanism and the reversing valve.

6. In an elevator, a car, a hoisting apparatus comprising a driving sheave, cable connections between the car and said sheave, an internal combustion engine, a fluid pressure power transmission mechanism between the sheave and the engine, an electrical control system for the transmission system, and a manually operated switch in the car.

7. In an elevator, a car, a hoisting apparatus comprising a driving sheave, cable connections between the car and said sheave, an internal combustion engine, a pumping apparatus arranged to be driven thereby, a fluid pressure motor connected with said sheave, and means for controlling said pumping apparatus from the car.

8. In an elevator, a car, a hoisting apparatus comprising a driving sheave, cable connections between the car and said sheave, an internal combustion engine, a pumping apparatus arranged to be driven thereby, a fluid pressure motor arranged to drive said sheave, a reversing valve for the motor, and means for controlling said pumping apparatus and valve from the car.

9. In an elevator, a car, a hoisting apparatus comprising a driving sheave, cable connections between the car and said sheave, an internal combustion engine, a pumping apparatus arranged to be driven thereby, an electroresponsive device for controlling said pumping apparatus, a fluid pressure motor actuated by fluid from the pumping apparatus and arranged to drive the sheave, and a switch in the car for controlling the electroresponsive device.

10. In an elevator, a car, a hoisting apparatus comprising a driving sheave, cable connections between the car and said sheave, an internal combustion engine, a pumping apparatus arranged to be driven thereby, an electroresponsive device for controlling said pumping apparatus, a fluid pressure motor actuated by fluid from the pumping apparatus and arranged to drive the sheave, an electromagnetically actuated reversing valve for the motor, and a switch in the car for controlling the electroresponsive device and the valve.

11. In an elevator, a car, a hoisting apparatus comprising a driving sheave, cable connections between the car and said sheave, an internal combustion engine, a pumping apparatus arranged to be driven thereby, said pumping apparatus comprising a plurality of sections, electromagnetically actuated valves for controlling said pumping apparatus, a fluid pressure motor actuated by fluid under pressure from the pumping apparatus and arranged to drive the sheave, an electromagnetically actuated reversing valve for the motor, and a switch in the car for controlling the pump valves and the reversing valve.

12. In an elevator, a car, a hoisting apparatus comprising a driving sheave, cable connections between the car and said sheave, an internal combustion engine, a pumping apparatus arranged to be driven thereby, said pumping apparatus comprising a plurality of independently operable sections, electromagnetically actuated valves for controlling each of said sections, a fluid pressure motor actuated by fluid under pressure from the pumping apparatus and arranged to drive the sheave, an electromagnetically actuated reversing valve for the motor, and a manually operated switch in the car for actuating one or more of the pump valves and the reversing valve.

13. In an elevator, a car, a hoisting apparatus comprising a driving sheave, cable connections between the car and said sheave, an internal combustion engine arranged to run in one direction at a practically constant rate of speed, a pumping apparatus arranged to be driven by said engine, said pumping apparatus comprising a plurality of independently operable sections, electromagnetically actuated valves for controlling each of said sections, a fluid pressure motor actuated by fluid under pressure from the pumping apparatus and arranged to drive the sheave in either direction and at different speeds, an electrically actuated reversing valve for the motor, and a manually operated switch in the car for actuating one or more of the pump valves and the reversing valve to vary the speed of the motor and to determine its direction of rotation.

14. In an elevator, a car, a hoisting apparatus comprising a driving sheave, cable connections between the car and said sheave, an internal combustion engine arranged to run in one direction, a speed governor therefor, a pumping apparatus directly connected with the engine, said pumping apparatus comprising a plurality of independently operable sections, electromagnetically actuated valves for controlling each of said sections, a fluid pressure motor actuated by fluid under pressure from the pumping apparatus and arranged to drive the sheave in either direction and at different speeds, an electromagnetically actuated reversing valve for the motor, an electromagnetic accelerator for the engine, and a manually operated car-switch for controlling the pump valves, the reversing valve and the accelerator.

15. In an elevator, a car, a hoisting apparatus comprising a driving sheave, cable connections between the car and said sheave, an internal combustion engine arranged to run in one direction, a throttle valve for the engine, a speed governor driven by the engine and arranged to act upon the throttle valve to control the speed of the engine, a pumping apparatus directly connected with the engine, said pumping apparatus comprising a plurality of independently operable sections, electromagnetically actuated valves for controlling each of said sections, a fluid pressure motor actuated by fluid under pressure from the pumping apparatus and arranged to drive the sheave in either direction and at different speeds, an electromagnetically actuated reversing valve for the motor, an electromagnetic accelerator arranged to act upon the throttle valve to increase the speed of the engine, and a manually operated car-switch for controlling the pump valves, the reversing valve and the accelerator.

16. In an elevator, a car, a hoisting apparatus comprising a driving sheave, cable connections between the car and said sheave, an internal combustion engine arranged to run in one direction, a throttle valve for the engine, a speed governor driven by the engine and arranged to act upon the throttle valve to control the speed of the engine, a rotary pumping apparatus directly connected with the engine, said pumping apparatus comprising a plurality of independently operable sections of different capacities, valves for controlling each of said sections, electromagnetic means for operating said pump valves, a fluid pressure motor actuated by fluid under pressure from the pumping apparatus and arranged to drive the sheave in either direction at different speeds, an electromagnetically actuated reversing valve for the motor, an electromagnetic accelerator arranged to act in a plurality of steps upon the throttle valve to increase the speed of the engine, a wiring system, and a manually operated car-switch for controlling the pump valves, the reversing valve, and the accelerator.

17. In an elevator, a car, a hoisting apparatus comprising a driving sheave and an electromagnetically actuated brake for the sheave, cable connections between the car and said sheaves, an internal combustion engine arranged to run in one direction, a speed governor therefor, a pumping apparatus directly connected with the engine, said pumping apparatus comprising a plurality of independently operable sections, electromagnetically actuated valves for controlling each of said sections, a fluid pressure motor actuated by fluid under pressure from the pumping apparatus and arranged to drive the sheave in either direction and at different speeds, an electromagnetically actuated reversing valve for the motor, an electromagnetic accelerator for the engine, and a manually operated car-switch for controlling the brake, the pump valves, the reversing valve and the accelerator.

18. In an elevator, a car, a hoisting apparatus comprising a magnetic driving sheave, an energizing winding for said sheave, and an electromagnetically actuated brake; cable connections between the car and said sheave, an internal combustion engine arranged to run in one direction, a throttle valve for the engine, a speed governor driven by the engine and arranged to act upon the throttle valve to control the speed of the engine, a pumping apparatus directly connected with the engine, said pumping apparatus comprising a plurality of independently operable sections, electromagnetically actuated valves for controlling each of said sections, a fluid pressure motor actuated by fluid under pressure from the pumping apparatus and arranged to drive the sheave in either direction and at different speeds, an electromagnetically actuated reversing valve for the motor, an electromagnetic accelerator for the engine, and a manually operated car-switch for controlling the sheave winding, the brake, the pump valves, the reversing valve, and the accelerator.

19. In an elevator, a car, a hoisting apparatus comprising a driving sheave, cable connections between the car and said sheaves, an internal combustion engine arranged to run in one direction, a speed governor therefor, a pumping apparatus directly connected with the engine, said pumping apparatus comprising a plurality of independently operable sections, electromagnetically actuated valves for controlling each of said sections, a fluid pressure motor actuated by fluid under pressure from the pumping apparatus and arranged to drive the sheave in either direction and at different speeds, an electromagnetically actuated reversing valve for the motor, an electromagnetic accelerator for the engine, a manually operated car-switch, and an automatically operated limit-switch for controlling the pump valves, the reversing valve, and the accelerator.

20. In an elevator, a car, a hoisting apparatus comprising a magnetic driving sheave, an energizing winding for said sheave, an electromagnetically actuated brake; cable connections between the car and said sheave, an internal combustion engine arranged to run in one direction, a throttle valve for the engine, a speed governor driven by the engine and arranged to act upon the throttle valve to control the speed of the engine, a pumping apparatus directly connected with the engine, said pumping apparatus comprising a plurality of independently operable sections, electromagnetically actuated valves for controlling each of said sections, a fluid pressure motor actuated by fluid under pressure from the pumping apparatus and arranged to drive the sheave in either direction and at different speeds, an electromagnetically actuated reversing valve for the motor, an electromagnetic accelerator arranged to act upon the throttle valve to increase the speed of the engine, a manually operated car-switch and an automatically operated limit-switch for controlling the sheave winding, the brake, the pump valves, the reversing valve and the accelerator.

21. In an elevator, a car, a hoisting apparatus comprising a driving sheave, an energizing winding for said sheave, and an electromagnetically actuated brake; cable connections between the car and said sheave, an internal combustion engine arranged to run in one direction, a throttle valve for the engine, a speed governor driven by the engine and arranged to act upon the throttle valve to control the speed of the engine, a rotary pumping apparatus directly connected with the engine, said pumping apparatus comprising a plurality of independently operable sections of different capacities, valves for controlling each of said sections, electromagnetic means for operating said pump valves, a multiple cylinder reciprocatory motor actuated by fluid under pressure from the pumping apparatus and arranged to drive the sheave in either direction and at different speeds, an electromagnetically actuated reversing valve for the motor, an electromagnetic accelerator arranged to act in a plurality of steps upon the throttle valve to increase the speed of the engine, and a wiring system comprising a manually operated car-switch and automatically operated limit-switches for controlling the sheave winding, the brake, the pump valves, the reversing valve, and the accelerator.

22. In an elevator, a car, a hoisting apparatus comprising a driving sheave, connections between the car and said sheave, an internal combustion engine, an electric generator mechanically connected therewith, and a variable speed fluid pressure power transmission mechanism between the engine and the sheave; the engine being arranged to supply power for driving the hoisting apparatus, and the generator to supply energy for controlling the transmission mechanism.

23. In an elevator, a car, a hoisting apparatus comprising a driving sheave, connections between the car and said sheave, an internal combustion engine, an electric generator mechanically connected therewith, and a variable speed fluid pressure power transmission mechanism between the engine and the sheave, the engine being arranged to supply power for driving the hoisting apparatus, and the generator to supply energy for controlling the transmission mechanism and the hoisting apparatus.

24. In an elevator, a car, a hoisting apparatus comprising a driving sheave, cable connections between the car and said sheave, an internal combustion engine, an electric generator mechanically connected therewith, a variable speed fluid pressure power transmission mechanism between the engine and the sheave, and an electromagnetically actuated control system, said generator being arranged to supply current for the control system.

25. In an elevator, a car, a hoisting apparatus comprising a driving sheave, cable connections between the car and said sheave, an internal combustion engine, an electric generator mechanically connected therewith, a variable speed fluid pressure power transmission mechanism between the engine and the sheave, an electromagnetically actuated control system, said generator being arranged to supply current for the control system, and a car-switch for controlling said current.

26. In an elevator, a car, a hoisting apparatus comprising a driving sheave, cable connections between the car and said sheave, an internal combustion engine, an electric generator mechanically connected therewith, a variable speed fluid pressure power transmission mechanism between the engine and the sheave, an electromagnetically actuated control system, said generator being arranged to supply current for the control system, a manually operated car-switch, and an automatically operated limit-switch for controlling said current.

27. In an elevator, a car, a hoisting apparatus comprising a driving sheave, cable connections between the car and the sheave, an internal combustion engine, an electric generator mechanically connected therewith, an electromagnetic accelerator for the engine, said generator being arranged to supply current for actuating the accelerator.

28. In an elevator, a car, a hoisting apparatus comprising a driving sheave, cable connections between the car and the sheave, an internal combustion engine, an electric generator mechanically connected therewith, a fluid pressure power transmission mechanism between the engine and the sheave, and electromagnetic means for controlling said mechanism, the generator being arranged to supply current for actuating said electromagnetic means.

29. In an elevator, a car, a hoisting apparatus comprising a driving sheave, cable connections between the car and the sheave, an internal combustion engine, an electric generator mechanically connected therewith, a fluid pressure power transmission mechanism between the engine and the sheave, said mechanism comprising a pumping apparatus driven by the engine, valves for controlling the output of said pumping apparatus, and electromagnetic means for actuating the valves, said generator being arranged to supply current for the electromagnetic valve actuating means.

30. In an elevator, a car, a hoisting apparatus comprising a driving sheave, cable connections between the car and the sheave, an internal combustion engine, an electric generator mechanically connected therewith, a fluid pressure power transmission mechanism between the engine and the sheave, said mechanism comprising a pumping apparatus driven by the engine and a fluid pressure motor, valves for controlling the output of said pumping apparatus, electromagnetic means for actuating the valves, and an electromagnetically actuated reversing valve for the motor, said generator being arranged to supply current for actuating the pump valves and the reversing valve.

31. In an elevator, a car, a hoisting apparatus comprising a driving sheave, cable connections between the car and the sheave, an internal combustion engine, an electric generator mechanically connected therewith, an electromagnetic accelerator for the engine, a fluid pressure power transmission mechanism, said mechanism comprising a pumping apparatus driven by the engine, valves for controlling the output of said pumping apparatus, electromagnetic means for actuating the valves, and an electromagnetically actuated reversing valve for the motor, said generator being arranged to supply current for actuating the pump valves and the reversing valve.

32. In an elevator, a car, a hoisting apparatus comprising a driving sheave, means for magnetizing said sheave, cable connections between the car and the sheave, an internal combustion engine, an electric generator mechanically connected therewith, a fluid pressure power transmission mechanism between the engine and the sheave, said mechanism comprising a pumping apparatus driven by the engine, electromagnetically actuated valves for controlling the pumping apparatus, said generator being arranged to supply current for magnetizing the sheave and actuating the valves, and means for controlling the current from the car.

33. In an elevator, a car, a hoisting apparatus comprising a driving sheave, means for magnetizing said sheave, cable connections between the car and the sheave, an internal combustion engine, an electric generator mechanically connected therewith, a fluid pressure power transmission mechanism between the engine and the sheave, said mechanism comprising a pumping apparatus driven by the engine, and a fluid pressure motor; valves for controlling the output of the pumping apparatus, electromagnetic means for actuating said valves, an electromagnetically actuated reversing valve for the motor, said generator being arranged to supply current for actuating the pump valves and the reversing valve, and a car-switch for controlling said current.

34. In an elevator, a car, a hoisting apparatus comprising a driving sheave, cable connections between the car and the sheave, an internal combustion engine, an electric generator mechanically connected therewith, a fluid pressure power transmission mechanism between the sheave and the engine, and an electrical control system for the transmission system, said generator being arranged to supply current for the control system.

35. In an elevator, a car, a hoisting apparatus comprising a driving sheave, cable connections between the car and the sheave, an internal combustion engine, an electric generator mechanically connected therewith, a fluid pressure power transmission mechanism between the sheave and the engine, an electrical control system for the transmission system, said generator being arranged to supply current for the control system, and a manually operated switch in the car.

36. In an elevator, a car, a hoisting apparatus comprising a driving sheave, cable connections between the car and the sheave, an internal combustion engine, an electric generator mechanically connected therewith, a pumping apparatus arranged to be driven by the engine, electromagnetically actuated valve mechanism for controlling the pumping apparatus, a fluid pressure motor actuated by fluid from the pumping apparatus and arranged to drive the sheave, said generator being arranged to supply current for actuating the electroresponsive device, and a car-switch for controlling said current.

37. In an elevator, a car, a hoisting apparatus comprising a driving sheave, cable connections between the car and the sheave, an internal combustion engine, an electric generator mechanically connected therewith, a pumping apparatus arranged to be driven by the engine, said pumping apparatus comprising a plurality of sections, electromagnetically actuated valves for controlling said pumping apparatus, a motor actuated by fluid under pressure from the pumping apparatus and arranged to drive the sheave, an electrically actuated reversing valve for the motor, said generator being arranged to supply current for actuating the pump valves and the reversing valve, and a manually operated switch in the car for controlling said current.

38. In an elevator, a car, a hoisting apparatus comprising a driving sheave, cable connections between the car and the sheave, an internal combustion engine arranged to run in one direction, an electric generator mechanically connected therewith, a pumping apparatus arranged to be driven by the engine, said pumping apparatus comprising a plurality of independently operable sections, electromagnetically actuated valves for controlling each of said sections, a motor actuated by fluid under pressure from the pumping apparatus and arranged to drive the sheave in either direction and at different speeds, an electromagnetically actuated reversing valve for the motor, said generator being arranged to supply current for actuating the pump valves and the reversing valve, and a manually operated switch in the car for causing the current to actuate one or more of the pump valves and the reversing valve to vary the speed of the motor and to determine its direction of rotation.

39. In an elevator, a car, a hoisting apparatus comprising a driving sheave, cable connections between the car and the sheave, an internal combustion engine arranged to run in one direction, an electric generator mechanically connected therewith, a speed governor for the engine, a pumping apparatus directly connected with the engine, said pumping apparatus comprising a plurality of independently operable sections, electromagnetically actuated valves for controlling each of said sections, a fluid pressure motor actuated by fluid under pressure from the pumping apparatus and arranged to drive the sheave in either direction and at different speeds, an electromagnetically actuated reversing valve for the motor, an electromagnetic accelerator for the engine, said generator being arranged to supply current for actuating the pump valves, the reversing valve and the accelerator, and a manually operated car-switch for controlling said current.

40. In an elevator, a car, a hoisting apparatus comprising a driving sheave, cable connections between the car and the sheave, an internal combustion engine arranged to run in one direction, a throttle valve for the engine, a speed governor driven by the engine and arranged to act upon the throttle valve to control the speed of the engine, a rotary pumping apparatus directly connected with the engine, said pumping apparatus comprising a plurality of independently operable sections of different capacities, electromagnetically actuated valves for controlling each of said sections, a fluid pressure motor actuated by fluid pressure from the pumping apparatus and arranged to drive the sheave in either direction and at different speeds, an electromagnetically actuated reversing valve for the motor, an electromagnetic accelerator arranged to act in a plurality of steps upon the throttle valve to increase the speed of the engine, a wiring system, said generator being connected with the wiring system and arranged to supply current for controlling the pump valves, the reversing valve and the accelerator, and a manually operated switch in the car for controlling said current.

41. In an elevator, a car, a hoisting apparatus comprising a magnetic driving sheave, a winding for magnetizing said sheave, an electromagnetically actuated brake, cable connections between the car and the sheave, an internal combustion engine arranged to run in one direction, a throttle valve for the engine, a speed governor driven by the engine and arranged to act upon the throttle valve to control the speed of the engine, a rotary pumping apparatus directly connected with the engine, said pumping apparatus comprising a plurality of independently operable sections of different capacities, electromagnetically actuated valves for controlling each of said sections, a fluid pressure motor actuated by fluid under pressure from the pumping apparatus and arranged to drive the sheave in either direction and at different speeds, an electromagnetically actuated reversing valve for the motor, an electromagnetic accelerator arranged to act in a plurality of steps upon the throttle valve to increase the speed of the engine, a wiring system, said generator being connected with the wiring system and arranged to supply current for the sheave winding, the brake, the pump valves, the reversing valve, and the accelerator, and a manually operated car-switch for controlling said current.

42. In an elevator, a car, a hoisting apparatus comprising a driving sheave, cable connections between the car and the sheave, an internal combustion engine, an electric generator mechanically connected therewith, a fluid pressure power transmission mechanism between the engine and the sheave, said mechanism comprising a pumping apparatus driven by the engine, and a motor driven by fluid under pressure from the pumping apparatus; and electromagnetic means for varying the output of the pumping apparatus to vary the speed of the motor, said means being actuated by current from the generator.

43. In an elevator, a car, a hoisting apparatus comprising a driving sheave, cable connections between the car and the sheave, an internal combustion engine, an electric generator mechanically connected therewith, a fluid pressure power transmission mechanism between the engine and the sheave, said mechanism comprising a pumping apparatus driven by the engine, and a motor driven by fluid under pressure from the pumping apparatus; and electromagnetic means for varying the amount of fluid delivered to the motor from the pumping apparatus, to change the speed and effective torque of the motor, said means being actuated by current from the generator.

In testimony whereof I have signed my name to this specification in the presence of two subscribing witnesses.

CHARLES O. PEARSON.

Witnesses:
 FRANCIS B. WARD,
 ELLA TUCH.